June 2, 1959     R. L. COOK ET AL     2,888,713
METHOD OF PREPARING GLOBULAR PROPELLANT POWDER
Filed April 24, 1957
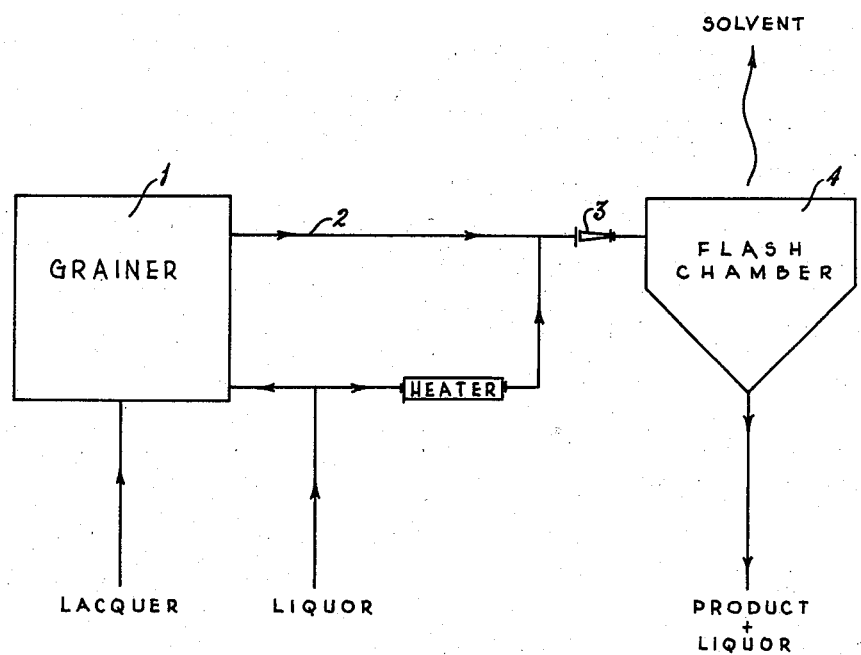
INVENTORS:
RALPH L. COOK
EUGENE A. ANDREW
BY
ATTORNEYS United States Patent Office 2,888,713
Patented June 2, 1959

2,888,713

METHOD OF PREPARING GLOBULAR PROPELLANT POWDER

Ralph L. Cook, Alton, Ill., and Eugene A. Andrew, Berkeley, Mo., assignors to Olin Mathieson Chemical Corporation, East Alton, Ill., a corporation of Virginia Application April 24, 1957, Serial No. 654,750

4 Claims. (Cl. 18—47.2)

This invention relates generally to the manufacture of explosives and particularly to the manufacture of spherical and near-spherical particles of propellent powder base.

A process of manufacturing smokeless powder grains wherein droplets of lacquer composed of a smokeless powder base and a solvent are solidified while suspended in a non-solvent medium is disclosed in U.S. Patent 2,027,114 granted January 7, 1936. Various techniques of controlling the product obtained by such a process are further disclosed in U.S. Patents 2,160,626 granted May 30, 1939, 2,213,255 granted September 3, 1940, and 2,375,175 granted May 1, 1945. These processes for the preparation of smokeless powder grains which are substantially gelatinized spheres or droplets of a propellent powder base have proven to be exceedingly satisfactory for the production of propellants suitable for use in small arms ammunition. While such processes involving the solidification of suspended droplets of smokeless powder base lacquer represent a very important advance in the production of propellants and the like, they do have some inherent disadvantages. Such processes require bulky, complicated, and expensive apparatus. They are particularly designed as batch processes and not adaptable to continuous operation. Although these processes entail less time than the older methods of making powder, they are quite time consuming and a schedule of several hours is required to complete the sizing, shaping and removal of the solvent from the lacquer particles.

It is, therefore, an object of this invention to provide a process for the manufacture of spherical or near-spherical grains of propellent powder base that overcomes the disadvantages of the prior art. It is also an object of this invention to provide a fast, simple, economical process for the production of gelatinized smokeless powder base particles from droplets of lacquer containing the base. Another object of this invention is to provide a novel continuous process for the preparation of globular or near-globular particles of propellent powder base.

In accordance with this invention, these and other objects are accomplished, generally speaking, by suspending propellent powder base lacquer particles in an immiscible non-solvent medium and mixing the suspension with an excess of the heated non-solvent medium so that the resultant mixture is at a temperature above the boiling point of the solvent in the lacquer. Best results are obtained when the initial suspension of the lacquer particles is made in a non-solvent medium at a temperature slightly below the boiling point of the solvent. However, the lacquer particles can be suspended in the non-solvent at room temperature and then added to an excess of non-solvent considerably above the boiling point of the lacquer solvent. In either event, this invention contemplates the rapid removal of the solvent from the suspended lacquer particles by very rapidly, in fact almost instantaneously, elevating the temperature of the system above the boiling point of the lacquer solvent. This can be accomplished at atmospheric pressure by the addition of a suspension of lacquer particles in a non-solvent medium at ambient temperatures to an excess of the non-solvent medium considerably above the boiling point of the solvent. In such instances, the solvent is driven off in vapor form in an exceedingly short period of time, thus providing solid spherical or near-spherical particles of the propellent powder base.

The preparation of the propellent powder base lacquer particles and their suspension in the non-solvent medium can be accomplished in a number of ways which do not form a part of the present invention. For example, the lacquer can be extruded through a perforated plate submerged in the non-solvent medium and provided with means for severing the extruded lacquer strands into short lengths as set forth in the application of J. J. O'Neill, Jr. and G. R. Cox, Serial Number 478,830, filed December 30, 1954 and assigned to Olin Mathieson Chemical Corporation, now abandoned. Also, when very small bodies of propellent powder base are desired, the suspended lacquer may be subjected to liquid shear in accordance with the process described in the application of Eugene A. Andrew, Serial No. 470,412, filed November 22, 1954, and assigned to Olin Mathieson Chemical Corporation, before the suspension is subjected to the process of the present invention. If desired, the lacquer can be prepared by dissolving particles of the propellent powder base while suspended in the non-solvent medium.

The advantages of this invention are more fully realized when the mixing of the lacquer suspension with the excess non-solvent medium is carried out under superatmospheric pressure and the solvent is flashed from the resultant mixture by reducing the pressure on the system to approximately atmospheric pressure. When superatmospheric pressure is utilized, the process of this invention is admirably suited to continuous operation. The suspension of the lacquer particles in the non-solvent medium at a temperature approximating the boiling point of the lacquer solvent is passed through an elongated vessel such as a pipe and near one end thereof is mixed with an excess of the non-solvent medium at a temperature considerably above the boiling point of the lacquer solvent. At this point, the vessel is vented by a small orifice through which the mixture passes into a flash chamber at about atmospheric pressure. This process particularly contemplates mixing a stream of the suspended lacquer particles with an excess of heated non-solvent medium and passing the mixed streams continuously through an orifice into a flash chamber where the solvent is very rapidly removed by the combined influence of the high temperature and the sudden reduction in pressure.

Regardless of the particular manner in which the process of this invention is executed, it is necessary that the solvent be removed from the suspended lacquer particles as promptly as possible. Thus, every provision must be made for the rapid egress of the solvent. It is essential that every suspended lacquer particle be not more than about 6 inches from the interface of the non-solvent medium with the surrounding atmosphere during the solvent removal period. When the solvent is required to travel a longer path through the suspending medium, it has been found that the efficiency of the process is seriously impaired and under some circumstances, practically inoperable.

In order that the invention may be further clarified following is an example illustrating a typical embodiment thereof. This embodiment will be described in connection with the drawing which diagrammatically illustrates the steps of the process. Unless otherwise indicated, all portions of the materials used are given in parts by weight and percentages are based on the weight of dry nitrocellulose. A nitrocellulose lacquer was prepared by adding 1.5 parts of water-wet nitrocellulose containing 0.5 parts water for each part nitrocellulose to 4 parts of ethyl acetate containing about 1.0% 2-nitrodiphenylamine and 0.25% of chalk. These materials were then mixed at a temperature of about 65° C. for about ½ hour or until the nitrocellulose was completely dissolved in the ethyl acetate so as to form an almost homogeneous lacquer. Meanwhile, a suspending medium was prepared by adding 3.4% sodium sulfate, 1.7% animal glue, and 0.5% ethyl acetate to water, each of these percentages being based on the total weight of the water. The water was then heated to about 65° C. with agitation until these materials were completely dissolved.

The lacquer and the non-solvent medium were then separately pumped to the grainer 1, the aqueous solution being introduced at a rate twice that of the lacquer. The lacquer was sub-divided into fine globules having an average diameter of less than about 0.010 inch and uniformly suspended throughout the aqueous medium. This mixture of lacquer and the suspending medium left the grainer through tubular passageway 2 and passed through orifice 3 into a flash chamber 4 at substantially atmospheric pressure. Just prior to moving into this orifice, a stream of hot liquor having the same composition as the suspending medium heated to approximately 128° C. under 40 pounds pressure was mixed with the suspension in the ratio of 5 parts of liquor to 1 part of the original suspension. This hot stream of aqueous solution provides the heat necessary for removing the solvent from the globules. This second stream was maintained under sufficient pressure to prevent boiling of the ethyl acetate, or the water in the liquor. When the resultant mixture passed through the orifice into the flash chamber 4 at about atmospheric pressure, the drop in pressure permitted the immediate removal of the solvent from the lacquer globules, the vaporization of which caused the temperature of the mixture to drop to about 96° C. The ethyl acetate and water vapors were removed from the flash chamber under very slight vacuum and recovered. The resultant slurry of the gelatinized nitrocellulose particles in the remaining ethyl acetate and water mixture was centrifuged so as to remove the nitrocellulose particles which were then washed and dried. The nitrocellulose particles thus prepared had an average diameter of approximately 0.002 inch to 0.004 inch, were of uniform spherical shape, and had a specific gravity of approximately 1.54.

Although the above embodiment is directed to a method of preparing fine diameter powder, the process is equally adaptable to the production of powders of the more conventional size between about 0.020 inch and 0.035 inch. In the above embodiment, ethyl acetate was used as the solvent for the nitrocellulose. When water is used as the non-solvent medium, any other water immiscible solvent for nitrocellulose can be used with equal facility. Thus, the ethyl acetate can be replaced by isopropyl acetate, butyl acetate, ethyl formate, methyl ethyl ketone, methyl isopropyl ketone, and the like. Water is generally preferred as a non-solvent medium because of the economies involved. In some instances, it may be desirable to utilize other non-solvent media such as solvent naphtha and chlorinated hydrocarbons, such as carbon tetrachloride, and the like. When such non-solvents are employed, it is only necessary that the lacquer solvent be immiscible with them. When non-solvent media other than water are used, water soluble solvents such as ethyl alcohol and acetone can be used in combination with them.

Nitrocellulose is the most commonly used propellent powder base. The nitrocellulose may be used alone or in combination with deterrents such as dinitrotoluene, dialkyl and diaryl phthalates, etc. Energizers such as nitroglycerine, trinitrotoluene, cyclotrimethylenetrinitramine, and the like can also be incorporated with the nitrocellulose. Whenever desirable, the nitrocellulose can be replaced in whole or in part by other gelatinizable polynitro materials such as nitrostarch, polyvinyl nitrate, and similar materials.

While one complete embodiment has been disclosed in detail and modifications therein suggested, it is to be understood that the example given is for the purpose of illustrating the invention, and not by way of limitation. It is recognized that those skilled in the art will make appropriate adjustment of the several variables in the process in order to adapt it to the peculiarities of any given operation, and consequently it is to be distinctly understood that the invention is not limited to the examples given, save as indicated in the appended claims.

Having thus described the invention, what is claimed and desired to be secured by Letters Patent is:

1. A method of preparing substantially solid globular nitrocellulose particles comprising the formation of a lacquer of nitrocellulose and a solvent therefor, subdividing the lacquer into discrete particles in suspension in an immiscible non-solvent liquid medium, maintaining the suspension under superatmospheric pressure sufficient to prevent boiling of the solvent and the non-solvent liquid medium, and continuously passing the suspension into additional quantities of the non-solvent immiscible medium at an elevated temperature and at atmospheric pressure such that the temperature of the system is above the boiling point of the solvent whereby the solvent is removed from the lacquer by reduction of the pressure below the vapor pressure of the solvent in the lacquer.

2. A method of preparing substantially solid globular nitrocellulose particles which comprises dissolving nitrocellulose in a solvent therefor to form a lacquer, subdividing the lacquer and suspending it in an immiscible non-solvent liquid medium at a temperature approximating the boiling point of the solvent, maintaining the suspension under a superatmospheric pressure sufficient to prevent boiling of the solvent and the non-solvent liquid medium, intermixing the suspension with an excess of immiscible non-solvent medium while the system is still maintained under said pressure, the resultant mixture having a temperature appreciably above the boiling point of the solvent, instantly reducing the pressure of the system to atmospheric pressure so as to remove the solvent from the lacquer and removing the nitrocellulose particles from the liquid system.

3. The method of claim 2 in which each particle of suspended lacquer is not more than about 6 inches from the surface of the mixture.

4. The process of claim 2 in which the intermixed suspension and excess immiscible non-solvent medium maintained under pressure is passed through an orifice into a flash evaporator maintained at a pressure not in excess of atmospheric.

References Cited in the file of this patent

UNITED STATES PATENTS

| | | |
|---|---|---|
| 503,585 | Du Pont | Aug. 22, 1883 |
| 874,264 | Volney | Dec. 17, 1907 |
| 1,965,362 | Wiggam | Sept. 16, 1929 |
| 1,983,434 | Black et al. | Dec. 4, 1934 |